United States Patent [19]

Lee

[11] Patent Number: 5,742,336
[45] Date of Patent: Apr. 21, 1998

[54] AIRCRAFT SURVEILLANCE AND RECORDING SYSTEM

[76] Inventor: Frederick A. Lee, 682 Broadway, New York, N.Y. 10012

[21] Appl. No.: 766,331

[22] Filed: Dec. 16, 1996

[51] Int. Cl.⁶ ........................................................ H04N 7/18
[52] U.S. Cl. .......................... 348/144; 348/143; 348/148; 348/160
[58] Field of Search .................... 348/143, 144, 348/148, 160; H04N 7/18

[56] References Cited

U.S. PATENT DOCUMENTS

| | | | |
|---|---|---|---|
| 4,568,972 | 2/1986 | Arents | 348/160 |
| 4,831,438 | 5/1989 | Belman | 348/151 |
| 5,283,643 | 2/1994 | Fujimoto | 348/143 |
| 5,508,736 | 4/1996 | Cooper | 348/144 |
| 5,570,127 | 10/1996 | Schmidt | 348/148 |

*Primary Examiner*—Howard W. Britton
*Attorney, Agent, or Firm*—Michael Ebert

[57] ABSTRACT

An aircraft surveillance and recording system adapted to monitor conditions prevailing in the course of a flight and provided for this purpose with video cameras placed at different sites on the plane. The output signals yielded by the video cameras are fed to an on-board radio-frequency transmitter to modulate a radio-frequency carrier that is radiated from the plane and intercepted by an active communication satellite. The satellite relays the signals to a ground recording station whose stored recording of the real time images from the cameras is available to investigators should an accident or other incident occur in the course of the flight. The system includes at least four video cameras, the first of which has an audio function and is trained on the flight crew in the cockpit of the plane. The second video camera is focused on the instrument panel and controls in the cockpit. The third camera which has an audio function looks into the passenger cabin, while the fourth camera is mounted on top of the aircraft rudder to observe exterior surface control movements, such as those of flaps, ailerons and elevators.

7 Claims, 2 Drawing Sheets

AIRCRAFT SURVEILLANCE AND RECORDING SYSTEM

BACKGROUND OF INVENTION

1. Field of Invention

This invention relates generally to aircraft surveillance and recording systems, and in particular to a system of this type in which video images and audio yielded by video cameras placed at various sites on the plane modulate a microwave carrier that is radiated from the plane and intercepted by a communication satellite that relays the modulated carrier to a ground recording station.

2. Status of Prior Art

The highly-publicized TWA Flight 800 catastrophe in which as a result of an explosion, the shattered plane crashed and became submerged in ocean waters, has heightened public concern with aircraft safety. And it has also raised serious questions regarding the effectiveness of existing techniques for determining the cause of an aircraft disaster.

In the interest of aircraft safety, it is the practice of Government agencies, such as the Federal Aviation Agency, to conduct a post-accident investigation to determine the cause of the accident. The purpose of this investigation is to find out whether the accident or disaster, whatever its nature, was due to pilot error, improper maintenance, mechanical failure or other factors. Also of concern to the investigator is the possibility that human intervention, accounts for the disaster such as sabotage.

The principal means heretofore available to an investigator of an aircraft disaster are flight recorders, commonly known as "black-boxes." In a commercial aircraft, there are two such black boxes, one being a recorder of instrument panel data, the other a recorder of the voices of the flight crew.

Each box is designed to withstand the rigors of a catastrophic plane crash. But while the black boxes can usually be recovered without difficulty when the plane crashes on land, it may be much more difficult to recover these boxes should the plane crash in ocean waters and sink to the ocean bed, as in the case of TWA Flight 800.

Black box recorders provide useful information, such as air speed, altitude, heading and vertical acceleration. And they record the conversation of the crew in the cockpit and in the flight deck area. These conversations may reveal what the crew believed to be taking place when an incident occurs leading to the disaster.

As pointed out in the Feher U.S. Pat. No. 4,816,829, black box data is inadequate for a complete analysis of the conditions prevailing at the time of an accident. Thus while the plane instrumentation is monitored and recorded by a black box, external control elements on the plane are not monitored, yet what happened to a control element may account for the accident.

In the surveillance system disclosed in the Feher patent, video cameras capture optical images of portions of the plane exterior, while other video cameras capture optical images of portions of the aircraft interior, and also that of the crew. These images are recorded in a protective enclosure within the aircraft designed to survive a crash. And Feher provides a telemetry device to transmit the video images to a ground recording station.

The serious drawback of the Feher surveillance system is that the ability of the plane to transmit the video images which monitor the flight is strictly limited to its range of transmission. Thus while the ground recording station may be able to pick up signals transmitted from the plane when the plane is within 300 miles of the recording station, it may not be able to pick up these signals when the distance is much greater. Moreover, such transmission from a plane is affected by changes in the ionosphere in the Earth's upper atmosphere.

The Fujimoto U.S. Pat. No. 5,283,643 notes that black boxes are not suitable for small aircraft. Instead of black boxes, the small plane is provided with a video camera in the cockpit and a video camera facing the nose of the fuselage tape to produce image informations that is fed to in a video recorder. But whatever video information is recorded remains on the plane, hence in the event of a crash, it may be difficult to recover this recording.

The Bellman et al. U.S. Pat. No. 4,839,439 discloses an aircraft surveillance system having audio as well as video sensors placed in the plane interior to produce signals that are transmitted to a ground recording station. While this system is intended to monitor what is taking place on the plane, and the recordings at the ground station will survive a crash, the system is limited in its effectiveness to a relatively short distance between the transmitting plane and the receiving ground station. A microwave transmitter installed on a small plane is necessarily of relatively low power and has a limited range.

SUMMARY OF INVENTION

In view of the foregoing, the main object of this invention is to provide an aircraft surveillance and recording system having video cameras both at interior and exterior sites on the plane to monitor the conditions prevailing in the course of a flight, the signals yielded by the video cameras being recorded at a ground station, whereby in the event of a disaster, an investigator is given access to the ground station recording to determine the cause of the disaster.

More particularly, an object of this invention is to provide a system of the above type in which video and audio signals yielded by the video cameras are microwave-transmitted to an active communication satellite which relays these signals to the ground recording station whereby the signals are received by the ground station regardless of its distance from the transmitting plane.

Also an object of the invention is to provide a system of the above type in which the video and audio signals yielded by the video cameras placed at various interior and exterior sites on the plane are combined to form a composite signal which is microwave transmitted to the active communication satellite and relayed thereby to the ground recording station.

A significant advantage of the invention is that unlike black boxes, it affords visual as well as acoustic data and makes it possible for an investigator to conduct a more complete analysis of the conditions which prevailed in the course of a flight, especially those at the time a disaster occurred.

Briefly stated, these objects are attained by an aircraft surveillance and recording system adapted to monitor conditions prevailing in the course of a flight and provided for this purpose with video cameras placed at different sites on the plane. The output signals yielded by the cameras are fed to an on-board radio-frequency transmitter to modulate a radio-frequency carrier that is radiated from the plane and intercepted by an active communication satellite. The satellite relays the signals to a ground recording station whose stored recording of the real time images from the cameras is available to investigators should an accident or other incident occur in the course of the flight.

The system includes at least four video cameras, the first of which has an audio function and is trained on the flight crew in the cockpit of the plane. The second video camera is focused on the instrument panel and controls in the cockpit. The third camera which has an audio function looks into the passenger cabin, while the fourth camera is mounted on top of the aircraft rudder to observe exterior surface control movements, such as those of flaps and ailerons.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
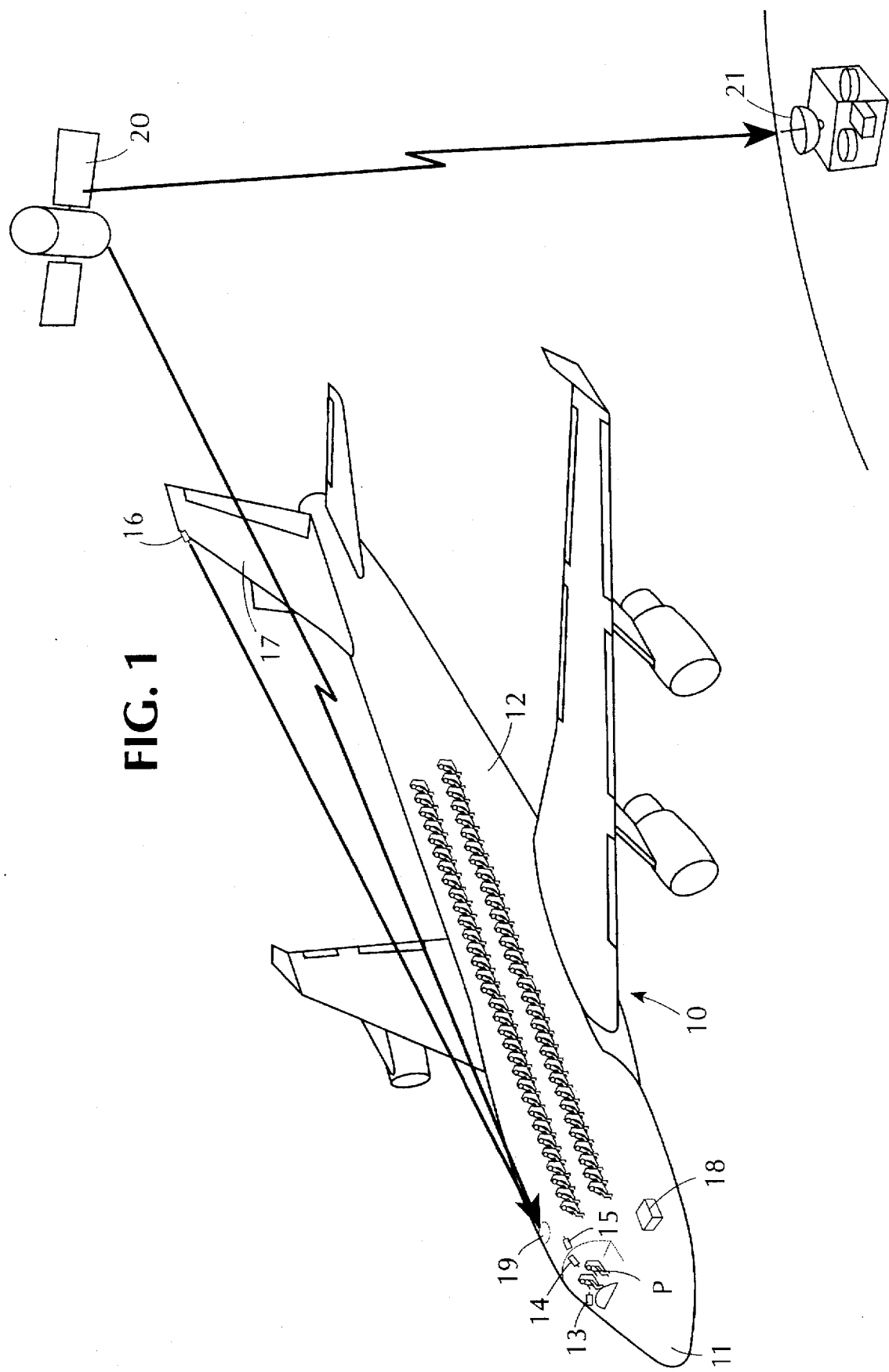
FIG. 1 schematically illustrates an aircraft surveillance and recording system in accordance with the invention.

Referring now to FIG. 1, shown therein is a jet engine commercial aircraft 10 equipped with a system in accordance with the invention in which video cameras placed at different sites in the plane serve to monitor conditions prevailing in the course of a flight.

Aircraft 10 is divided by a bulkhead having a door therein into a cockpit section 11 and a cabin section 12. The cockpit section is normally occupied by the pilot P and other members of the flight crew, the cockpit section being provided with an instrument panel and controls C. Cabin section 12 is occupied by passengers.

The system includes at least four video cameras 13, 14, 15 and 16. Video camera 13 which has a sound function and is therefore capable of picking up sounds from the scene being viewed, is placed at an overhead position in cockpit section 11 where it is trained on the flight crew (pilot P, co-pilot, navigator, etc.). Camera 13 is focused on the head-to-waist region of the flight crew and therefore observes the faces of the crew and hears the conversation of the crew in the course of flight.

Video camera 14 is mounted in cockpit section 11 behind and above the flight crew, this camera being focused on the instrument panel and controls C in front of the flight crew. Hence in the course of a flight, camera 14 observes the readings of the meters on the instrument panel as well as the changing positions of the control sticks and levers and other central mechanisms.

Video camera 15 which has a sound function, is placed above the bulkhead separating the cockpit section from the cabin section and is trained to observe and hear the passengers in the cabin sections. Thus if there is a disturbance in this cabin in the course of flight, this will be picked up by camera 15.

Camera 16 is a panoramic video camera without a sound function. It is housed in a shielded casing having an aerodynamic shape, for this camera is mounted on top of rudder 17 at the rear of the plane. Camera 16 views the exterior surface of the plane to observe all exterior surface control movements, such as those of flaps and ailerons. In practice, means are provided to illuminate when there is little ambient light, the upper surface of the plane to a degree sufficient to reveal the control elements observed by camera 16.

Installed within the aircraft is a compact microwave or short wave radio transmitter 18 whose output is coupled to a flush dish antenna 19 mounted on the plane exterior above the cockpit section. The video and video signals yielded by video cameras 13 to 16 are applied to the input of transmitter 19 to modulate the radio-frequency or microwave carrier generated by the transmitter. In practice, digitized signals derived from the instruments on the instrument panel which in a plane equipped with a black box recorder are then recorded in the black box, are in a system in accordance with the invention applied to the transmitter to modulate the microwave carrier.

The modulated carrier radiated from antenna 19 is intercepted by a communication satellite 20. A communication satellite is a space craft placed in orbit around the Earth, the satellite intercepting, amplifying and retransmitting the signals it receives. Hence the satellite acts as a repeater in space.

An active communication satellite is an orbiting self-sustaining repeater that receives a signal transmitted from an Earth station at one frequency or band of frequencies and simultaneously retransmits these signals on another frequency or band of frequencies. The retransmission of the signal at different frequencies is necessary to avoid feedback problems.

Active satellites now orbit the Earth in synchronous orbits whereby the satellites always remain at the same azimuth and elevations. Thus overseas TV transmission is carried out by such satellites to provide a video of picture quality rivaling that of a local TV station. Radio transmission is normally affected by the ionosphere, an ionized layer in the Earth's upper atmosphere which reflects radio waves. But a transmission from an active communication satellite orbiting the Earth is unaffected by changing ionospheric conditions and they therefore offer reliable and predictable communication circuits.

Satellite 20 relays the signals received from aircraft 10 to a ground recording station 21. This station records in a video and audio tape recorder the received video signals and maintains the recording in storage for a period sufficient to permit playback by an investigator who is seeking to determine the cause of an incident or accident that occurred in the course of the recorded flight. At the conclusion of the storage period, the recording is erased so that the video tape may be used to record another aircraft flight. The storage period is the optimal period of time determined by operational use, and in practice this period may be as short as 10 days after the date of the fight or a much longer period.

While one may record in a separate video tape at the ground recording station, each of the video image yielded by the four video cameras on board the aircraft, there are practical advantages to be gained by combining the outputs of the cameras to form a composite signal to be recorded in a single broad video tape. In this way the conditions prevailing in the course of the flight can be integrated to facilitate a more complete analysis. Thus the position of the ailerons observed by one camera at a particular time can be correlated to instrument panel readings at the same time.

Figure 2B:
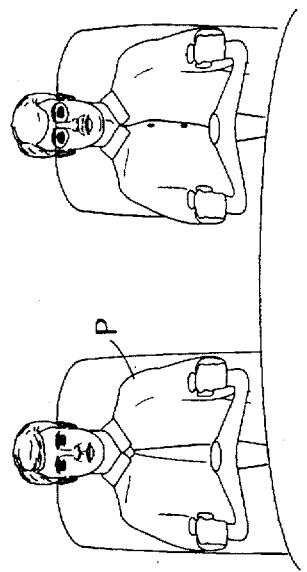
FIG. 2A, 2B, 2C and 2D illustrates the composite video image produced by the system.
Figure 2A:
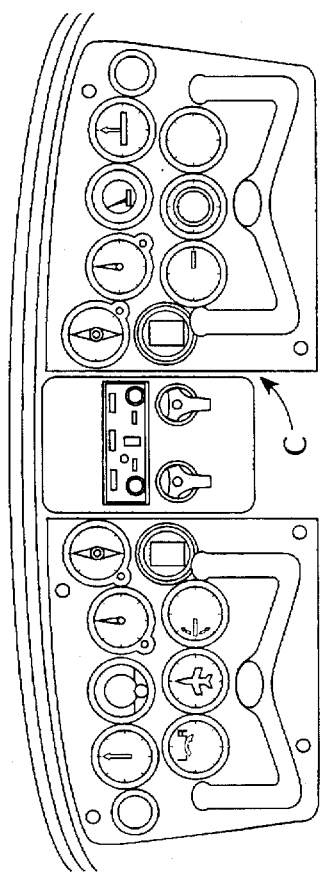
Figure 2D:
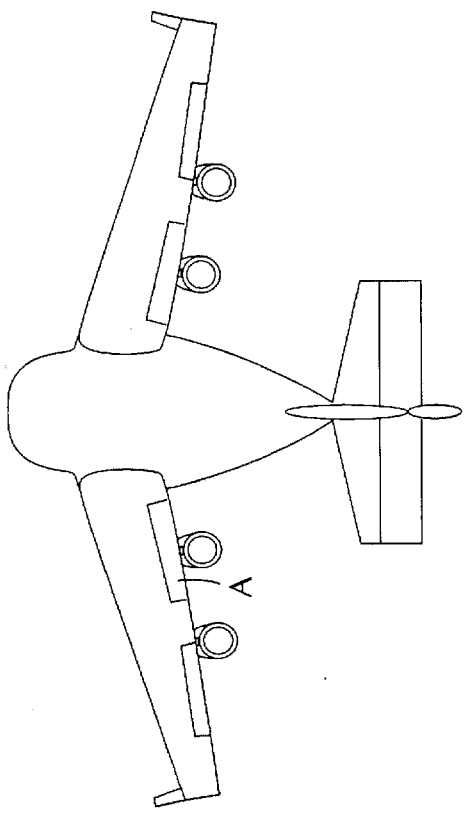
Figure 2C:
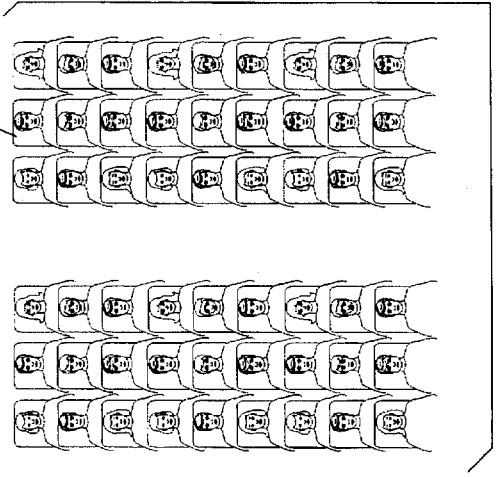

To conduct an investigation, the video recording of the flight of interest is played back on a video monitor and the resultant images are presented on a video screen. When the video signals are in a composite form then, as shown in FIG. 2A, one section A on the screen will exhibit only the instrument panel C. The second section as shown in FIG. 2B will show the flight crew including pilot P. The third section as shown in FIG. 2C will show the passengers Pa in the cabin. And the fourth section as shown in FIG. 2D will show the ailerons A on the wings.

With a modern video tape reproducer or monitor, one is able to selectively present on the screen either a composite image containing all of the video images obtained by the four video cameras, or magnify any one of the images which then fully occupies the screen. Thus if section B is selected for full screen presentation, one sees on the screen the flight crew and also hears the conversations of the members of the crew in the course of the flight. Or one may present on the screen only the instrument panel in section A, and then enlarge any one of the meters or indicators or the panel.

Because the system operated in conjunction with a communication satellite, it can be used for monitor conditions prevailing in the course of an aircraft flight in which the flight path can be anywhere in the world, for regardless of the location of the plane it is in touch with an active communication satellite which picks up the signal transmitted by the plane and relays it to a ground recording station. To obtain world wide coverage, one may set up a network of ground recording stations.

While there has been shown a preferred embodiment of the invention, it is to be understood that many changes may be made thereon within the spirit of the invention. Thus while the system has been described as including four video cameras placed at different sittes on the plane to yield real-time image video signals, a greater number of cameras may be used to observe activity inside or on the exterior of the plane that is not picked up by the four cameras.

I claim:

1. An aircraft surveillance and recording system adapted to monitor conditions prevailing on the course of a flight and operating in conjunction with an active communication satellite, the aircraft including a cockpit section occupied by a flight crew provided with an instrument panel and controls, said system comprising:

A. a plurality of video cameras placed at different sites in the plane to yield real-time image video signals; one of said video cameras being placed in the cockpit section and being focused on said instrument panel and controls, a second of said cameras which include an audio function being placed in the cockpit section to view the faces of the flight crew and pick up their voices;

B. a transmitter installed in the plane which generates a radio frequency carrier and is coupled to an antenna which radiates the carrier so that it can be intercepted by the satellite;

C. means to apply the video signals from the cameras to the transmitter to modulate the carrier, whereby the satellite retransmits the modulated carrier; and D. a ground recording station adapted to receive retransmitted video signals from the satellite and to record and store these signals, including those exhibiting the instrument panel and controls as well as the flight crew and their voices whereby an investigator of an aircraft accident, by playing the record, can then analyze the conditions which prevailed at the time of the accident.

2. A system as set forth in claim 1, in which said aircraft includes a cabin section occupied by passengers, and a third of said plurality of cameras looks into the cabin to observe the passengers.

3. A system as set forth in claim 2, in which the third camera includes an audio function that picks up the voices of the passengers.

4. A system as set forth in claim 1, in which the aircraft is provided with a rudder and a fourth of the plurality of video cameras is mounted on top of the rudder to observe exterior surface control movements, such as those of flaps, ailerons and elevators.

5. A system as set forth in claim 4, in which said of fourth video camera is housed in an aerodynamically-shaped protective casing.

6. A system as set forth in claim 1, in which the output signals from the plurality of video cameras are combined to produce a composite signal for modulating the microwave carrier.

7. A system as set forth in claim 6, in which said ground recording station includes a video monitor to play the recording of said composite signal and to exhibit the recording on a video screen divided into sections, each section showing a respective video image.

* * * * *